United States Patent
Doisy et al.

(10) Patent No.: US 7,075,858 B2
(45) Date of Patent: Jul. 11, 2006

(54) SIGNAL PROCESSING METHOD FOR A TOWED LINEAR ANTENNA

(75) Inventors: Yves Doisy, Grasse Plascassier (FR); Laurent Deruaz, Mouans Sartoux (FR); Edmond Noutary, Juan les Pins France (FR)

(73) Assignee: THALES, Neuilly-sur-Seine (FR)

( * ) Notice: Subject to any disclaimer, the term of this patent is extended or adjusted under 35 U.S.C. 154(b) by 306 days.

(21) Appl. No.: 10/487,451

(22) PCT Filed: Aug. 20, 2002

(86) PCT No.: PCT/FR02/02909

§ 371 (c)(1), (2), (4) Date: Feb. 23, 2004

(87) PCT Pub. No.: WO03/019224

PCT Pub. Date: Mar. 6, 2003

(65) Prior Publication Data

US 2004/0240317 A1  Dec. 2, 2004

(30) Foreign Application Priority Data

Aug. 24, 2001  (FR) .................................. 01 11106

(51) Int. Cl.
*G01S 3/805* (2006.01)
*G01V 1/20* (2006.01)
*G01V 1/38* (2006.01)

(52) U.S. Cl. ...................................................... 367/12
(58) Field of Classification Search .................. 367/12, 367/19, 106, 130
See application file for complete search history.

(56) References Cited

U.S. PATENT DOCUMENTS 5,058,082 A * 10/1991 Bertheas et al. ............... 367/12

FOREIGN PATENT DOCUMENTS

| FR | 2651950 A | 3/1991 |
| FR | 2685848 A | 7/1993 |
| FR | 2727765 A | 6/1996 |

* cited by examiner

*Primary Examiner*—Daniel Pihulic
(74) *Attorney, Agent, or Firm*—Lowe Hauptman & Berner, LLP

(57) ABSTRACT

The disclosure relates to a signal processing method for a towed linear antenna, notably to resolve right-left ambiguity, said antenna comprising a set of hydrophone multiplets each with $n \geq 3$ hydrophones spread over a straight section of the longitudinal axis of said antenna, wherein the roll angle of each multiplet relative to the vertical is measured, the signals of said hydrophones and said roll angles are used to synthesize $p \geq 3$ linear sub-antennas, then M azimuth channels are formed with each sub-antenna and 2 adaptive right-left channels are formed from said p sub-antennas for each direction corresponding to each azimuth channel. The invention resolves right-left ambiguity with optimal performance in detection and for long antennas.

16 Claims, 3 Drawing Sheets

SIGNAL PROCESSING METHOD FOR A TOWED LINEAR ANTENNA

BACKGROUND OF THE INVENTION

The present invention relates to a method of processing signals from a towed linear antenna. It notably resolves right-left ambiguity on such an antenna when it is activated, in other words when it is receiving echoes produced from emissions of an active sonar.

There are known techniques for resolving this right-left ambiguity, described in particular in the French patent no.8911749 filed by the company THOMSON-CSF on 8 Sep. 1989 and published on 15 Mar. 1991 under the U.S. Pat. No. 2,651,950 and delivered on 17 Apr. 1992, which consist in replacing each omnidirectional hydrophone by at least 3 hydrophones mounted in a plane perpendicular to the axis of the linear antenna and spread around a circle, inside the antenna and centered on its axis. In this manner, a volumic antenna is constituted enabling construction of antenna responses with right-left rejection capabilities. In particular, the processing of the signals enables a "zero" to be created in the ambiguous direction relative to the setpoint direction of the channel.

To remove the ambiguity satisfactorily using this technique, it is necessary that the "triplets" of hydrophones (or more generally the "n-multiplets") be aligned so as to constitute a set of 3 (n) linear sub-antennas. This linearity can be assured by means of rigid links between the triplets, but this has the disadvantage of working well only for antennas that are not too long. However it is increasingly common to reduce the working frequency in order to increase the range, but this reduction generally implies increasing the length of the antennas proportionally, in which case it becomes increasingly difficult to control the linearity of the sub-antennas.

Moreover, since the antenna diameter is small compared with the wavelength, the creation of a zero leads to signal losses that become larger at lower frequencies, in particular when the dominant noise is decorrelated between hydrophones of the same triplet, which represents a second very serious disadvantage.

SUMMARY OF THE INVENTION

The processing according to the invention overcomes these drawbacks, notably by:
  eliminating the effects of rotation of the triplets (or n-multiplets) relative to each other,
  ensuring a gain between the formation of an antenna channel and the formation of a right-left channel, regardless of the dominant noise conditions.

For this purpose, the object of the invention is a signal processing method for a towed linear antenna, notably to resolve right-left ambiguity, said antenna comprising a set of hydrophone multiplets each with $n \geq 3$ hydrophones spread over a straight section of the longitudinal axis of said antenna, wherein the roll angle of each multiplet relative to the vertical is measured, the signals of said hydrophones and said roll angles are used to synthesize $p \geq 3$ linear sub-antennas, then M azimuth channels are formed with each sub-antenna and 2 adaptive right-left channels are formed from said p sub-antennas for each direction corresponding to each azimuth channel.

According to another characteristic of the invention, a coherent treatment is used to form said M azimuth channels.

According to another characteristic of the invention, to form said right-left channels the inverse interspectral matrix $\hat{\Gamma}^{-1}$ is estimated on N+1 time samples and A+1 Doppler channels, then two dephasing vectors $d_r$ and $d_l$ are determined associated with the right and left channels for each azimuth channel, and the channels $V_{right}$ and $V_{left}$ are determined from these vectors and this inverse matrix.

According to another characteristic of the invention, inclinometers are used to determine the roll angles.

According to another characteristic of the invention, $n=p=3$.

BRIEF DESCRIPTION OF THE DRAWINGS

The invention will be better understood and its other particularities and advantages will become clear on reading the detailed description below of an embodiment, which is non-limitative and taken only as an example, with reference to the attached drawings of which.

MORE DETAILED DESCRIPTION

Figure 1:
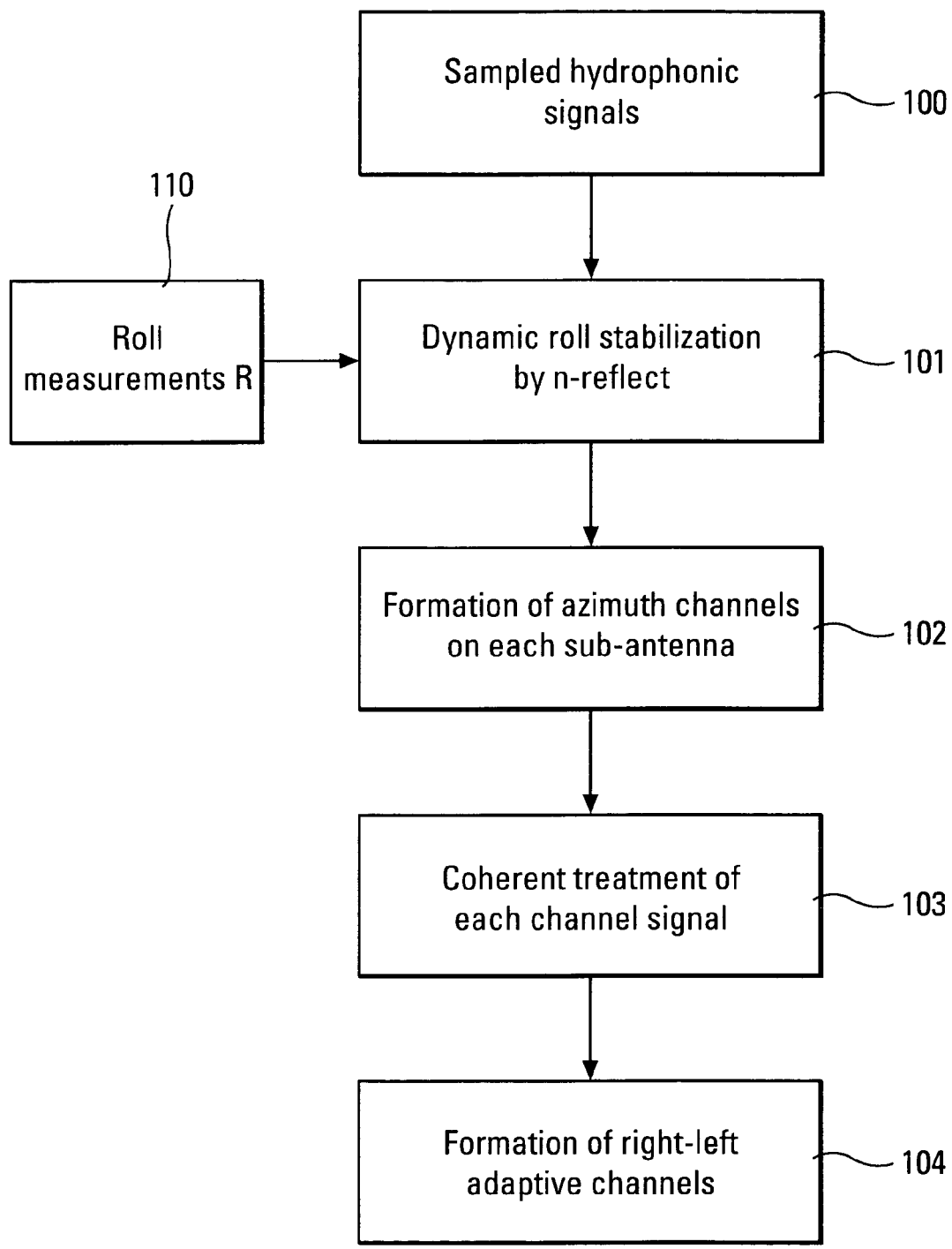
FIG. 1 is a block-diagram illustrating the process according to the invention.

The processing according to the invention includes 4 modules of steps, as shown in FIG. 1.

Figure 2:
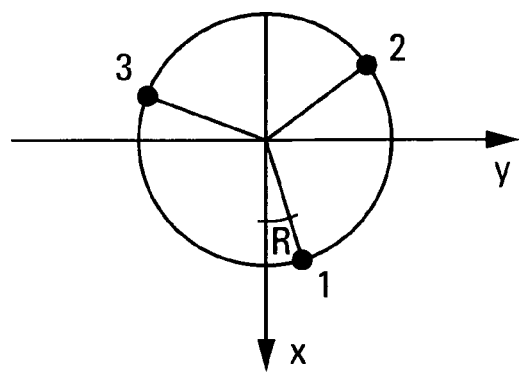
FIG. 2 is a graph defining the roll angle used in the calculations.

A first module 101 receives the hydrophonic signals from all the hydrophone multiplets of the antenna sampled in a first preliminary module 100 and the roll angles R measured in a second preliminary module 110 at each multiplet (or only some of them) by means of a controlled sensor, for example an inclinometer, as defined in FIG. 2.

The treatment carried out in this module 101 consists in forming using the n hydrophones of each multiplet and the indication of their roll angle R, p virtual hydrophones having a fixed angular position independent of the multiplet considered, so as to reconstitute p linear antennas to obtain dynamic roll stabilization of the whole antenna.

Figure 3:
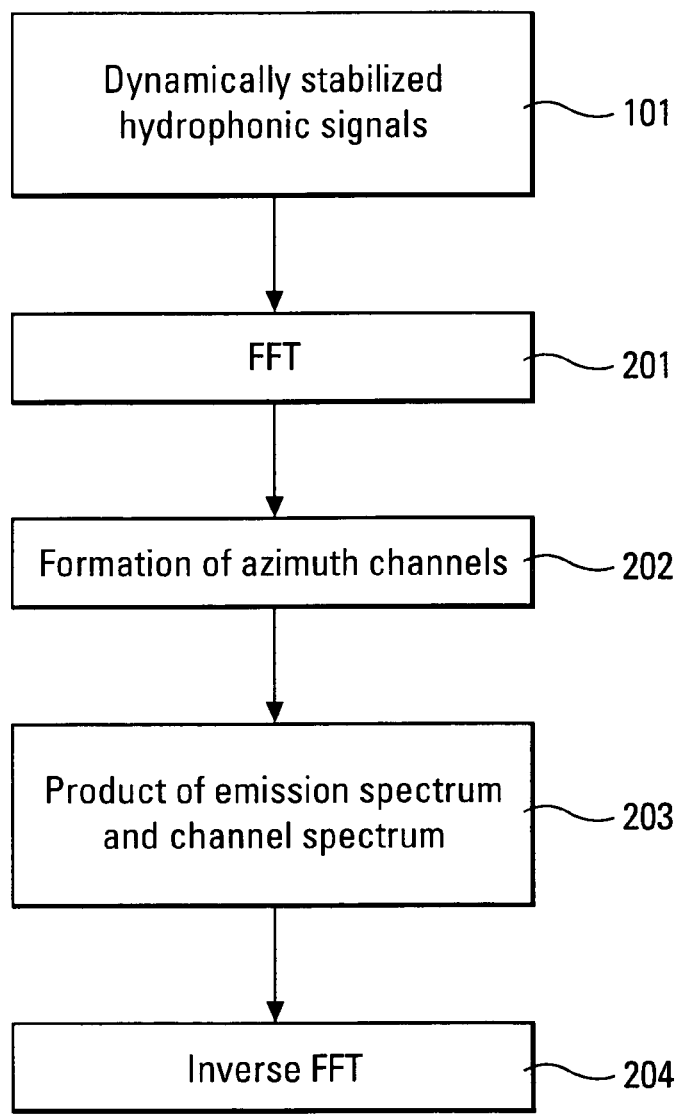
FIG. 3 is a block-diagram developing the steps 102 and 103 of FIG. 1.

To do this, the hydrophone signals are interpolated spatially using a known technique. In a preferred embodiment, n=3 and p=3, which corresponds to the well-known triple antenna. The steps 102 and 103 in which the azimuth channels on each sub-antenna are formed and each channel signal is treated coherently are implemented in the frequency domain in 4 modules of steps, as shown in FIG. 3. These calculation steps are known from the prior art.

In the case where the emitted code is sensitive to the Doppler, the coherent treatment is a multicopy treatment known from the prior art, described for example in the French patent published under the number 2 6787 226.

Described succinctly, the hydrophonic signals stabilized dynamically in the module 101 are converted from time space into frequency space by a fast Fourier transform (FFT) 201. Next, in a known manner the azimuth channels are formed in a module 202, then the product of the conjugated spectra of the Dopplerized emission signal and the spectrum of each channel is computed in a module 203. An inverse FFT is performed in a module 204 to obtain the channel signals treated coherently, corresponding to those delivered by the module 103.

In a module 104, an adaptive channel is formed on each azimuth channel obtained at the output of stage 103.

The azimuth channels are then distributed according to the cosine of the azimuth varying from −1 to +1: if u designates the cosine of the azimuth, the pointing directions obey the relation:

$$u_m = (2m+1)/M_v$$

where $$-\frac{M_v}{2} \le m \le \frac{M_v}{2} - 1,$$

and $M_v$ is the number of azimuth channels.

The output signal of channel m of the linear antenna I ($1 \le l \le 3$) at time t will be denoted $V_l(m,t,\alpha)$, and $\vec{V}(m,t,\alpha)$ will designate the column vector constituted by the 3 components $V_1$, $V_2$, $V_3$ for the azimuth m at time t with a "Doppler" of $\alpha$.

The "Doppler" $\alpha$ is defined as the Doppler shift $2\vec{V}/C$, where $\vec{V}$ is the resultant vector of the radial velocities of the emitter and the receiver and C is the speed of sound propagation in water. Its range of variation is determined by 2 values of $\alpha$ corresponding to extreme speeds. It is known that the width of a Doppler channel is given by:

$$\Delta\alpha = 1/f_0 T$$

where $f_0$ and T are respectively the central frequency and the duration of the emission code. A+1 adjacent Doppler channels are thus defined between the 2 extreme values of $\alpha$.

Figure 4:
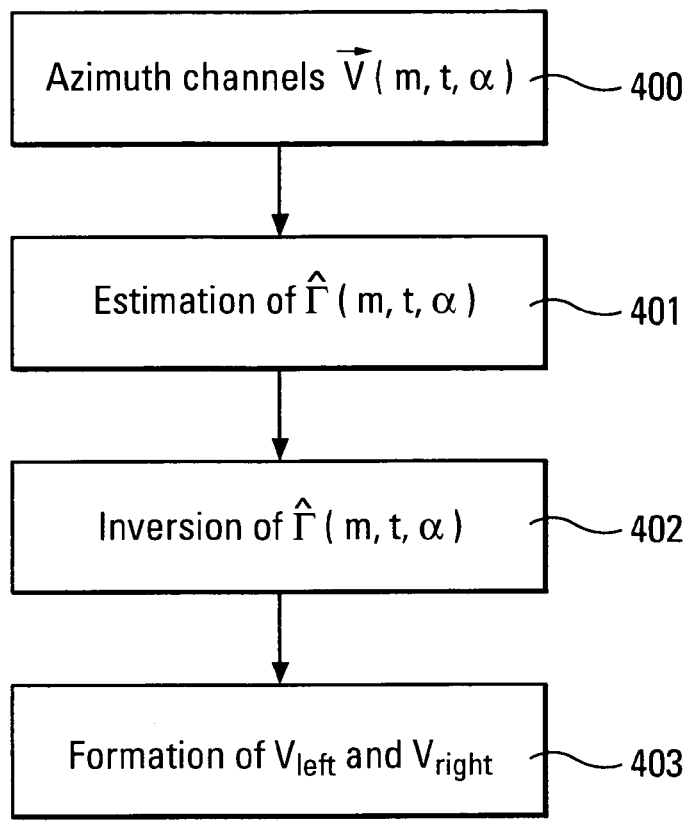
FIG. 4 is a block-diagram developing step 104 of FIG. 1.

The module 104 comprises 3 modules of sub-stages represented in FIG. 4:
estimation of the interspectral matrix (401);
inversion of the interspectral matrix (402);
formation of the 2 right-left channels (403).

In the module 401, the interspectral matrix $\hat{\Gamma}(m,t,\alpha)$ is estimated by averaging over N+1 time samples and over A+1 Doppler channels, applying the formula:

$$\hat{\Gamma}(m,t,\alpha) = \sum_{\alpha'=-A/2}^{A/2} \sum_{t'=-N/2}^{N/2} \vec{V}(m, t+t', \alpha+\alpha') \cdot [\vec{V}(m, t+t', \alpha+\alpha')]^+$$

the notation "+" designating the conjugated transposed matrix. Advantageously, the time coverage is 50%.

The matrix $\hat{V}(m,t,\alpha)$ having a small dimension (p), the estimation requires about 1.5 p to 2 p independent observations and is therefore performed over a very short time period, enabling the treatment to adapt to environmental variations (noise, reverberation) and also to take into account the echo and reject it in the channels of direction opposite to its arrival direction.

In the module 402, the inverse matrix $\hat{\Gamma}^{-1}(m,t,\alpha)$ is computed using a known direct method.

Finally, in the module 403 the left and right channels $V_{left}$ and $V_{right}$ are formed, in the manner explained below in the case of a triplet.

Figure 5:
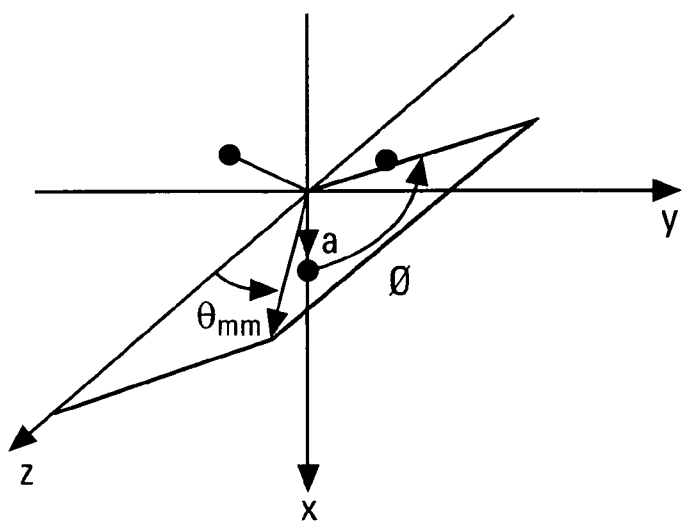
FIG. 5 is a graph defining other angles used in the calculations.

FIG. 5 shows the notations used in this case of a triplet: "a" is the radius of the triplet; $\theta$ and $\phi$ are the angles corresponding to the pointing direction of a channel when it is formed.

To do this, in the module 403, the 2 channels $V_{left}$ and $V_{right}$ are formed by first calculating the 2 dephasing vectors $d_r$ and $d_l$ associated with the right and left channels for each azimuth channel.

For pointing in the horizontal plane, in other words $\phi=0$, these 2 vectors are given by the following equations:

$$d_l(m) = \begin{bmatrix} \exp\left[i2\pi a\frac{f_0}{c}\sin\theta_m \cos\left(R - \frac{\pi}{2}\right)\right] \\ \exp\left[i2\pi a\frac{f_0}{c}\sin\theta_m \cos\left(\frac{2\pi}{3} + R - \frac{\pi}{2}\right)\right] \\ \exp\left[i2\pi a\frac{f_0}{c}\sin\theta_m \cos\left(\frac{4\pi}{3} + R - \frac{\pi}{2}\right)\right] \end{bmatrix}$$

$$d_r(m) = \begin{bmatrix} \exp\left[i2\pi a\frac{f_0}{c}\sin\theta_m \cos\left(R + \frac{\pi}{2}\right)\right] \\ \exp\left[i2\pi a\frac{f_0}{c}\sin\theta_m \cos\left(\frac{2\pi}{3} + R + \frac{\pi}{2}\right)\right] \\ \exp\left[i2\pi a\frac{f_0}{c}\sin\theta_m \cos\left(\frac{4\pi}{3} + R + \frac{\pi}{2}\right)\right] \end{bmatrix}$$

where $f_0$ is the transmit frequency.

The channels $V_{left}$ and $V_{right}$ are then formed by applying the following equations:

Left channel: $$V_{left}(m, t, \alpha) = \frac{d_g^+(m)\hat{\Gamma}^{-1}(m, t, \alpha)}{d_g^+(m)\hat{\Gamma}^{-1}(m, t, \alpha)d_g(m)} \cdot \vec{V}(m, t, \alpha)$$

Right channel: $$V_{right}(m, t, \alpha) = \frac{d_d^+(m)\hat{\Gamma}^{-1}(m, t, \alpha)}{d_d^+(m)\hat{\Gamma}^{-1}(m, t, \alpha)d_d(m)} \cdot \vec{V}(m, t, \alpha)$$

For a given setpoint direction, the treatment builds a conventional channel and a noise reference having a zero in the setpoint direction, then it subtracts coherently the reference signal from the signal of the conventional channel. Consequently:

in the target direction: this is excluded from the noise reference, and the treatment achieves optimal gain relative to the ambient noise;

in the ambiguous direction, the target is taken into account in the noise reference and is subtracted as interference, thereby allowing a right/left rejection. This is possible because the echo coming from the target has a sufficient level thanks to the coherent treatment carried out before the formation of the channels $V_{left}$, $V_{right}$, and also because the duration of estimation of the matrix is shorter than the duration of the echo.

The invention claimed is:

1. A signal processing method for a towed linear antenna, notably to resolve right-left ambiguity, said antenna comprising a set of hydrophone multiplets each with $n \ge 3$ hydrophones spread over a straight section of the longitudinal axis of said antenna, comprising the steps of: measuring the roll angle of each multiplet relative to the vertical when the signals of said hydrophones and said roll angles are used to $p \ge 3$ linear sub-antennas, forming M azimuth channels with each sub-antenna;

and 2 adaptive right-left channels are formed from said p sub-antennas for each direction corresponding to each azimuth channel.

2. The process according to claim 1, wherein a coherent treatment is used to form said M azimuth channels.

3. The process according to claim 1, wherein to form said right-left channels the inverse interspectral matrix fry $\hat{\Gamma}^{-1}$ is estimated on N+1 time samples and A+1 Doppler channels, then two dephasing vectors $d_r$ and $d_l$ associated with the right and left channels are determined for each azimuth channel and the channels $V_{right}$ and $V_{left}$ are determined from these vectors and this inverse matrix.

4. The process according to claim 2, wherein to form said right-left channels the inverse interspectral matrix $\hat{\Gamma}^{-1}$ is estimated on N+1 time samples and A+1 Doppler channels, then two dephasing vectors dr and d associated with the right and left channels are determined (403) for each azimuth channel and the channels $V_{right}$ and $V_{left}$ are determined from these vectors and this inverse matrix.

5. The process according to claim 1, wherein inclinometers are used to determine said roll angles.

6. The process according to claim 2, wherein inclinometers are used to determine said roll angles.

7. The process according to claim 3, wherein inclinometers are used to determine said roll angles.

8. The process according to claim 4, wherein inclinometers are used to determine said roll angles.

9. The process according to claim 1, wherein n=p=3.
10. The process according to claim 2, wherein n=p=3.
11. The process according to claim 3, wherein n=p=3.
12. The process according to claim 4, wherein n=p=3.
13. The process according to claim 5, wherein n=p=3.
14. The process according to claim 6, wherein n=p=3.
15. The process according to claim 7, wherein n=p=3.
16. The process according to claim 8, wherein n=p=3.

* * * * *